United States Patent
Eiden et al.

(10) Patent No.: US 6,829,487 B2
(45) Date of Patent: Dec. 7, 2004

(54) METHOD AND APPARATUS FOR ESTABLISHING A COMMUNICATION GROUP

(75) Inventors: Niko Eiden, Helsinki (FI); Johannes Lehto, Vantaa (FI)

(73) Assignee: Nokia Corporation, Espoo (FI)

( * ) Notice: Subject to any disclaimer, the term of this patent is extended or adjusted under 35 U.S.C. 154(b) by 450 days.

(21) Appl. No.: 10/100,860

(22) Filed: Mar. 18, 2002

(65) Prior Publication Data

US 2002/0168992 A1 Nov. 14, 2002

(30) Foreign Application Priority Data

May 10, 2001 (FI) .............................................. 20010986

(51) Int. Cl.[7] ................................................ H04B 7/00
(52) U.S. Cl. ..................................................... 455/519
(58) Field of Search ................................. 455/518, 519, 455/416, 520, 41.2, 445; 370/338

(56) References Cited

U.S. PATENT DOCUMENTS 6,240,089 B1     5/2001  Okanoue et al.
6,484,037 B1 *  11/2002  Schmidt et al. ............. 455/514
6,748,230 B1 *   6/2004  Murphy et al. ............. 455/518

FOREIGN PATENT DOCUMENTS

WO    WO-00/30374 A2    5/2000
WO    WO 00/30374       5/2000
WO    WO-01/31836 A2    5/2001

* cited by examiner

Primary Examiner—Nick Corsaro
(74) Attorney, Agent, or Firm—Harrington & Smith, LLP

(57) ABSTRACT

A method and apparatus for joining a communication group between users of wireless communication devices, comprising at least two users (302, 305) of communication devices who are members of said group and capable of communicating with each other through communication devices, and at least one communication device user (301) not belonging to said group, who is capable of communicating with at least one member (305) of the communication group through a communication device. In the method, the communication device user (301) not belonging to said group creates an apply message (308), transmits the apply message (308) wirelessly to at least one member (305) of said communication group for the purpose of becoming a member of said group, at least one member (305) of the group creates a feedback (307) on joining said group, transmits the feedback (307) wirelessly in response to the received apply message, and a decision is formed on joining said group in response to said feedback.

28 Claims, 8 Drawing Sheets

METHOD AND APPARATUS FOR ESTABLISHING A COMMUNICATION GROUP

FIELD OF THE INVENTION

The present invention relates to a method and apparatus for establishing a wireless communication group especially, but not necessarily, in a mobile system.

BACKGROUND OF THE INVENTION

Various discussion groups and real-time discussion services have become more and more popular among users. The popularity of communication groups has increased especially since the use of the Internet has become more widespread among the general public. In discussion groups, people are able to express their thoughts and comments to others from their own terminals, such as computers connected to the Internet.

Establishing a wireless communication group became more common and popular among the users of mobile stations with mobile systems, such as GSM. For instance, a family, hobby group or working community can establish communication groups and have discussions between group members at a price less than the regular telephone rate. This, however, requires an advance agreement with the operator providing the service. When using said service, it is possible to communicate in-group matters only with members in telephone communication at the time in question. Such a method does not provide a possibility for all members of the group to share information simultaneously.

A group call enables more than two persons using a communication device to communicate in real time. Establishing a group and transmitting information between group members may, however, be difficult, since a certain time for establishing the group call is not always suitable for all parties. In addition, establishing a group call can be disadvantageous in its cost distribution, since the costs arisen from the communication are not necessarily divided evenly between all group members.

Mobile systems also provide a possibility to send and receive messages in short-message form, which has made a different kind of group communication possible. Messages can be sent to one or more group members. A drawback in the method is, however, that the group must be established for every message transmission. In addition, the principle of group communication should be taken into account in replying to the message and the message should be replied to in such a manner that the reply, too, is transmitted to all group members. Nokia Communicator 9110 and e-mail applications, for instance, provide the possibility to transmit a group message in such a manner that the same message can be transmitted to a predefined group in one transmission.

A known solution for establishing a group is described in an earlier application of the applicant (WO 00/30374) disclosing a method and an apparatus for transmitting a voice message in one transmission to a group of communication devices in a communication network, such as mobile network. The application discloses a method for establishing a group of a set of communication devices by connecting said devices together and by creating a group establishment message that is transmitted to each device connected to the group. The connection of the devices can be either a wireless or physical connection, such as cable connection. In addition, group information is preferably transmitted to a server in the communication network that stores and updates the group information and transmits said group information to communication devices connected to the group after the group has been established.

The prior art solution does not, however, provide a solution for selecting a group member in such a manner that all group members have a possibility to participate in the selection. Because the group as a communicating unit possibly shares confidential information, and the group members can be socially bound to each other, it is important that the group members know about possible new members. In addition, all users should when receiving a group establishment message connect to the group. This is not always possible, since all group members do not necessarily at a given moment have time to consider for instance whether a new member candidate is suitable for the group or not.

SUMMARY OF THE INVENTION

A method and an apparatus have now been invented for establishing a communication group between wireless communication devices in a radio network.

The invention enables a user of a communication device to join an existing group of communication device users by employing an acceptance process based on the decision of the group members. The applicant applies for membership separately from each group member, and after all group members have replied to the applicant, the applicant will receive information on whether his membership has been accepted or rejected. Depending on the definitions of the acceptance process made inside the group, the applicant is accepted as a member unanimously, in which case all group members are for the applicant, by a majority decision, in which case more than half of the total number of members in the group are for the applicant, or by a decision in which a certain member or part of the group members are for the applicant.

According to a first aspect of the invention, a method is implemented for selecting a new member to a communication group of users of wireless communication devices, the communication group comprising at least two communication device users who are members of said group, and at least one communication device user who does not belong to said group, which (communication device not belonging to said group) applies for membership in said communication group and is capable of communicating with at least one member of the communication group through his communication device, characterized in that the method comprises the following steps: creating an apply message in said communication device not belonging to the group, said apply message comprising a request for membership in said communication group; transmitting the apply message wirelessly from the communication device not belonging to said group to the communication device of at least one member of said communication group for the purpose of becoming a member of said group; creating by at least one group member a feedback concerning joining said group in response to the received apply message; and forming a decision on joining said group in response to said at least one feedback.

According to a second aspect of the invention, a wireless communication device is implemented for said communication device user joining a communication group of wireless communication devices, said communication group comprising at least two users of communication devices who are members of said group, and said communication device being capable of communicating with the communication device of at least one member of said communication group, characterized by said wireless communication device comprising: means for creating an apply message in said communication device, said apply message comprising a request for membership in said communication group; means for transmitting the apply message wirelessly from said communication device to the communication device of at least one member of said communication group; means for receiving a feedback wirelessly from the communication device of at least one group member in response to the transmitted apply message; and means for forming a decision on joining said group in response to said feedback.

According to a third aspect of the invention, a wireless communication device is implemented for selecting a user of a second communication device not belonging to a communication group of wireless communication devices to said communication group, said communication group comprising at least two users of communication devices who are members of said group, and said wireless communication device is used by at least one of the group members and said wireless communication device is capable of communicating with at least one second communication device not belonging to said communication group, characterized by said wireless communication device comprising: means for receiving an apply message wirelessly, said apply message comprising a request for membership in said communication group; means for creating a feedback on accepting the communication device applying for membership in the group in response to the received apply message; means for transmitting the feedback wirelessly to at least one of the following: the communication device of the user of said communication device not belonging to the communication group, the communication device of at least one other member of said communication group.

According to a fourth aspect of the invention, a system is implemented for selecting a new member to a communication group of users of wireless communication devices, the communication group comprising at least two users of communications devices who are members of said communication group, and at least one user of a communication device not belonging to said group who applies for membership in said communication group and is capable of communicating with at least one member of the communication group through his communication device, characterized by the system comprising: means for creating an apply message by the user of the communication device not belonging to said group; means for transmitting the apply message wirelessly by the user of the communication device not belonging to the group to at least one member of said communication group for the purpose of becoming a member in said group; means for receiving the apply message wirelessly, said apply message comprising a request for membership in said communication group; means for creating a feedback on accepting the communication device applying for membership in the group in response to the received apply message; means for transmitting the feedback wirelessly to at least one of the following: the communication device of the user of said communication device not belonging to the communication group, the communication device of at least one other member of said communication group; means for forming a decision on joining said group in response to said feedback.

According to a fifth aspect of the invention, a computer program product is implemented for a wireless communication device for the user of said communication device to join a communication group of wireless communication devices, the communication group comprising at least two users of wireless communication devices who are members of said group, and said wireless communication device being capable of communicating with the communication device of at least one member of said communication group, characterized in that the computer program product comprises: computer program means for making said wireless communication device to create an apply message ordered by the user of the communication device not belonging to said group, said apply message comprising a request for membership in said communication group; computer program means for making said wireless communication device to send, ordered by the user of the communication device not belonging to said group, the apply message wirelessly to at least one member of said communication group for the purpose of becoming a member of said group; computer program means for making said wireless communication device to receive a feedback wirelessly from at least one member of the group in response to the transmitted apply message; and computer program means for making said wireless communication device to form a decision on joining said group in response to said feedback.

According to a sixth aspect of the invention, a computer program product is implemented for a wireless communication device for selecting a user of a second communication device not belonging to a communication group of wireless communication devices to said communication group, said communication group comprising at least two users of wireless communication devices who are members of said communication group, and said wireless communication device being used by at least one of the group members and capable of communicating with at least one other communication device not belonging to said communication group, characterized in that the computer program product comprises: computer program means for making said wireless communication device to receive an apply message wirelessly, said apply message comprising a request for membership in said communication group; computer program means for making said wireless communication device to create a feedback on accepting the communication device applying for membership in the group in response to the received apply message; computer program means for making said wireless communication device to transmit the feedback wirelessly to one of the following: the communication device of the user of said communication device not belonging to the communication group, the communication device of at least one other member of said communication group.

BRIEF DESCRIPTION OF THE DRAWINGS

In the following, the invention will be described in detail with reference to the attached drawings in which.

DETAILED DESCRIPTION

Figure 1:
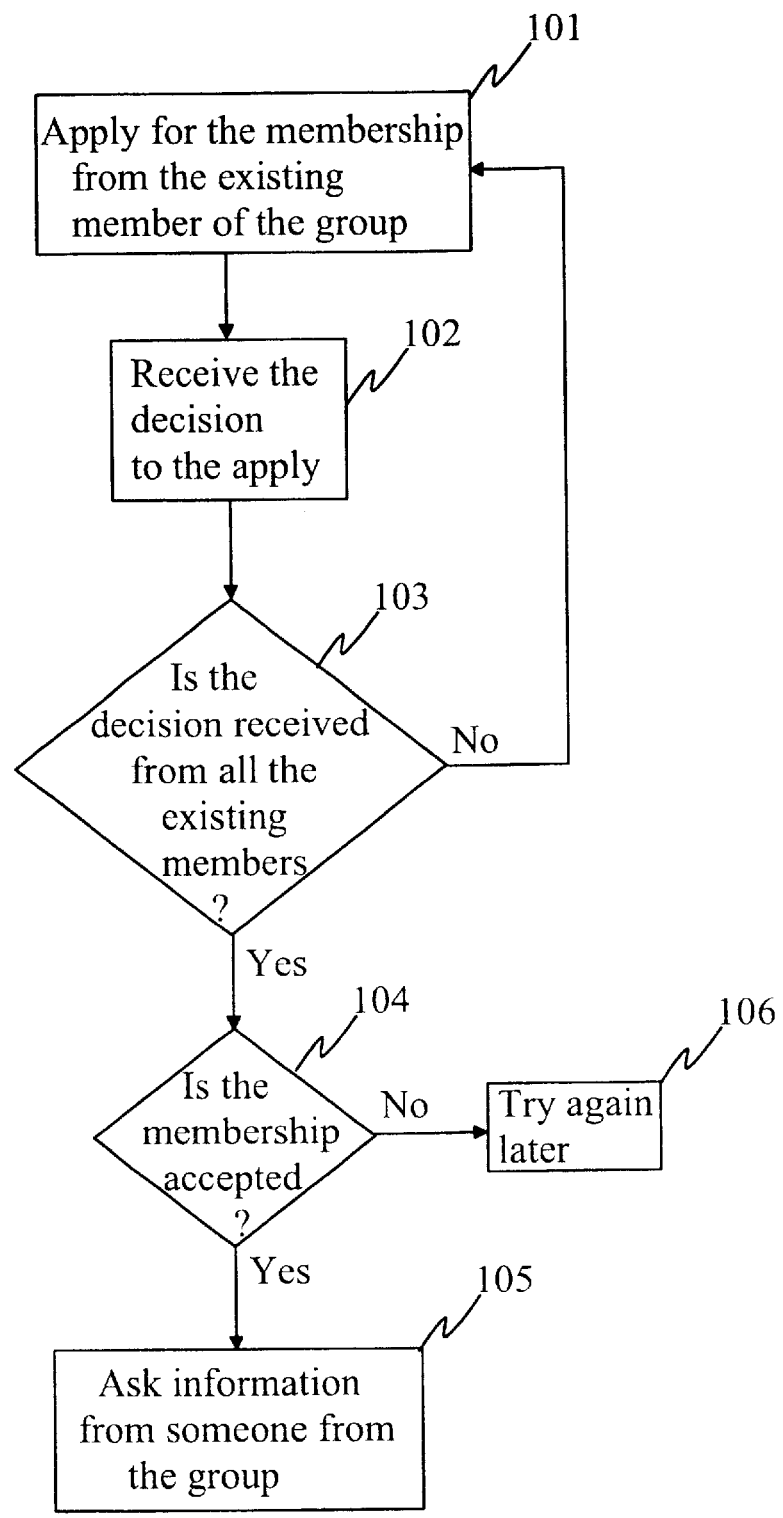
FIG. 1 shows a flow chart of a method according to one embodiment of the invention for the joining of a potential member as a member of a group.

FIG. 1 shows a flow chart of a method according to one embodiment of the invention for the joining of a potential member as a member of a group. In step 101, the potential new member, i.e. applicant, applies for membership from an existing member of said group. This can be done in such a manner, for instance, that the applicant creates by means of a communication application of his communication device an apply message and transmits said apply message by his communication device to a member of the group, preferably to all the group members that are within the range of the communication device of the applicant.

The apply message can be transmitted to each group member separately in a separate message or alternatively as one message to all the group members that are within the range of the communication device of the applicant. The apply message comprises a request for membership in said group. The apply message also comprises at least one of the following identifiers: an identifier associated with the applicant, an identifier associated with the applicant's communication device, or both the above-mentioned identifiers. The identifier associated with the applicant can for instance comprise name, address or other corresponding identification or contact information. The identifier associated with the applicant's communication device can for instance comprise the identifier or identity number of the applicant's communication device or subscriber connection, such as the IMSI (International Mobile Subscriber Identity) or IMEI (International Mobile Station Equipment Identity) code. The identifier can also comprise a combination of both above-mentioned identifiers. The apply message can also comprise information on the applicant, on the basis of which a group member can form his decision concerning the membership of the applicant. Such information includes the name and address information of the applicant, memberships of other groups, and comments on the applicant by members of other groups. Said information is not restricted to the above, but other information not mentioned herein can also be used. The apply message can also comprise information on the members who have already provided feedback to said apply message.

The applicant receives in step 102 the feedback of the group member, i.e. feedback information that can for instance comprise a decision accepting or rejecting the membership. The feedback can also comprise at least one of the following identifiers: an identifier associated with the sender of the feedback, i.e. group member, an identifier associated with the communication device of the sender of the feedback, or both above-mentioned identifiers. The identifier associated with the sender of the feedback can for instance comprise name, address or other corresponding identification or contact information. The identifier associated with the communication device of the sender of the feedback can for instance comprise the identifier or identity number of the communication device of the applicant. The identifier can also comprise a combination of both above-mentioned identifiers.

After the first member has replied, the communication device of the applicant can receive information on the provider of said feedback information and possibly information on the other members of said group, such as name and/or contact information and the total number of members in the group. The above-mentioned information received by the communication device of the applicant will not be transmitted to the applicant, if so decided by the group. Step 103 is a check to see if all group members have already sent their reply on their selection. If not, the applicant also sends his request for membership to the other members of the group by performing steps 101 to 103 until all group members have sent their replies.

When all group members have replied, the routine moves to step 104 to check whether the membership has been accepted or rejected. This can be done as a unanimous or majority decision, for instance. If a unanimous decision is required, all group members must send a positive reply in order for the new member to join the group. If a majority decision is required, it is enough to have a certain majority, for instance over 50% of the group members for the new member and correspondingly under 50% of the group members against the membership. Alternatively, a majority decision can be implemented in such a manner that if all members have not yet sent their feedback and a predefined limit for the acceptance or rejection of the membership has been exceeded so that the remaining feedbacks will no longer change the final situation, the membership of the applicant can be decided on before all members have sent their feedback. The percentage distribution of the group is not limited to what is stated above, but other ratios can also be used. The number of votes sufficient for accepting a membership can be set to any number, it can also be under 50%.

Figure 2:
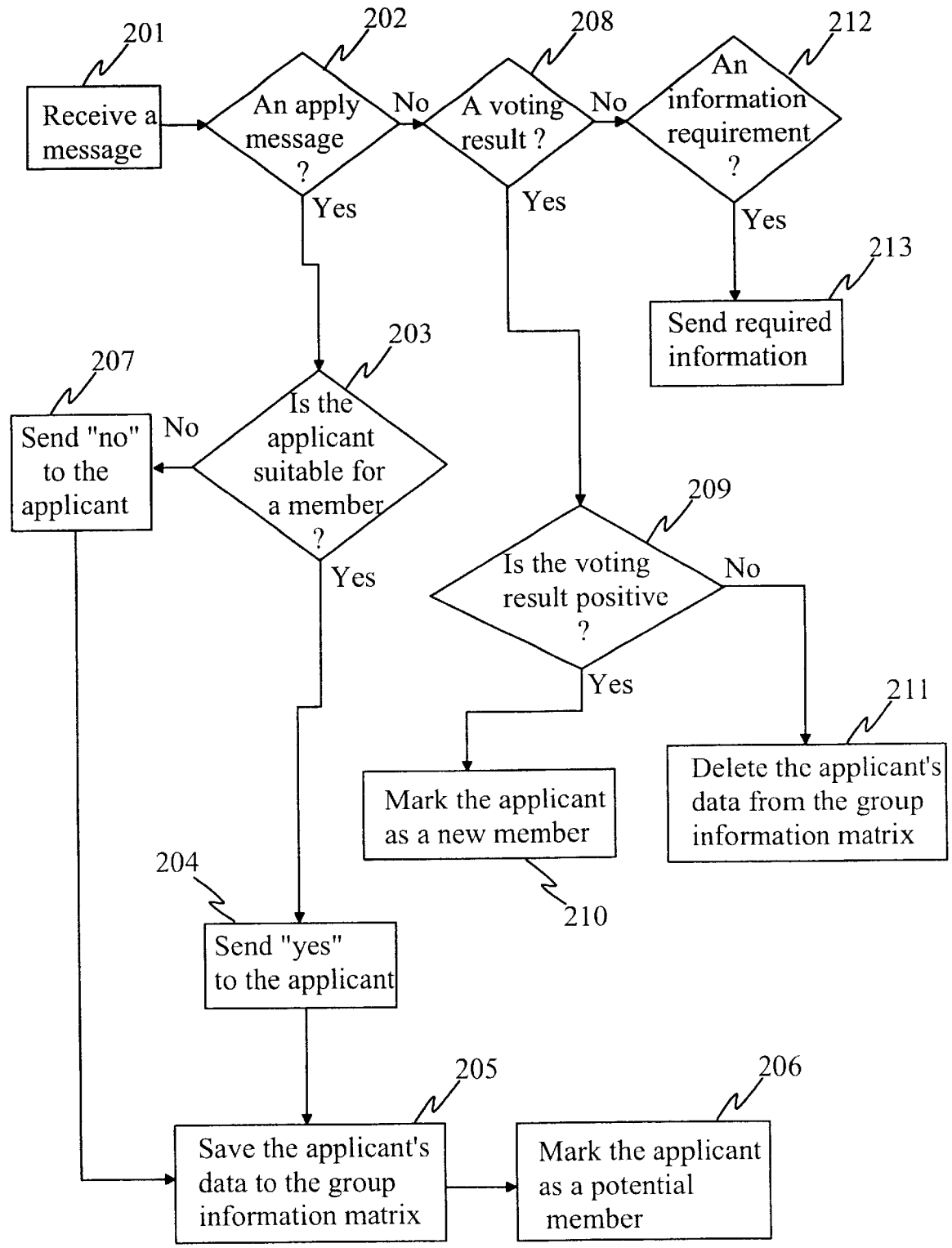
FIG. 2 shows a flow chart of a method according to one embodiment of the invention for the selection of a potential member as a member of the group, FIGS. 3a to 3d describe a system according to one embodiment of the invention.

FIG. 2 shows a flow chart of a method according to an embodiment of the invention for selecting a potential member to a group by a member of said group. The group member receives a message (step 201) that can, for instance, be a membership request from a person applying for membership (reference 202), a voting result deciding on the selection of the applicant from the applicant or another group member (reference 208), for instance, or a request for information from an accepted new member (reference 212). The membership request is preferably received by a communication application implemented for receiving said membership request. Other alternative embodiments enabling the reception of a membership request can also be used. Such embodiments include reception as a voice message or short message. Step 202 is a check to see if said message is a membership request from a potential member wanting to join the group, or some other message. If it is a membership request, the group member forms a decision in step 203 on whether the applicant is suitable to be a member of the group on the basis of the information, for instance, that the group member received in the membership request message. If the member considers the applicant suitable to be a member of the group, the member votes for the membership of the applicant and transmits his reply as feedback information to the applicant (step 204) and stores the received information of the applicant in his communication device, for instance in a database register, such as a group information matrix, (step 205) and marks the applicant as a potential member (step 206). If in step 203, the member is of the opinion that the applicant is not suitable to be a member, the member votes against the membership of the applicant and transmits his reply as feedback information to the applicant (step 207). In this case, too, the group member stores the received information of the applicant in his communication device, for instance in the group information matrix mentioned earlier, (step 205) and marks the applicant as a potential member (step 206).

If in step 201, the received message is a voting result deciding on the selection of the applicant from the applicant or another group member (208), for instance, the routine checks (step 209) whether said result is positive or negative for the applicant. If the voting result is positive and the applicant has been accepted as a member, said group member can set the applicant as a new group member in his communication device for instance manually or alternatively said communication device can perform said setting automatically (step 210). Information on the new member can be stored for instance in the group information matrix in the communication device of the group member, which matrix comprises information on the group members, such as the identification information of each member, the identification information of the communication device of each member, or the status of each group member, i.e. is the group member an active member, resigned from the group or applying for membership. The communication device of the group member is arranged to modify the information of the new member that was stored earlier. If in step 209, the voting result is negative for the applicant, the applicant's information can be deleted from the group information matrix of the communication device of said group member (step 211).

If in step 201, the received information is an information request from a new member (step 212), for instance, the group member can send (step 213) information on the group to the newly selected member, the information comprising for instance inside information on the group, such as name, address and other contact information of the members.

FIGS. 3a to 3d show a system according to an embodiment of the invention that preferably comprises short-range radio communication devices, such as Bluetooth communication devices. The system can also be of another type, such as a GMS, GPRS or some other communication system. In the system, the communication device of a person applying for membership in a group creates an apply message for the membership request, transmits the apply message to the members of the group, receives the decisions of the members and forms a voting result on the basis of the received decisions. Said system is preferably a system in which a compatible communication system for joining the group and for data transmission between the group members and between the group members and the applicant is used in both the communication device of the person applying for membership and the communication devices of the group members. The apply message can also comprise or it is possible to transmit together with it information on the person applying for membership, such as name, address or other corresponding information. Alternatively, if no other compatible communication system is available at the time, the apply message can also be created and transmitted as a voice message, such as a call or an audio message, as a short message or as a message created by means of a communication application, such as e-mail or the like.

Figure 3A:
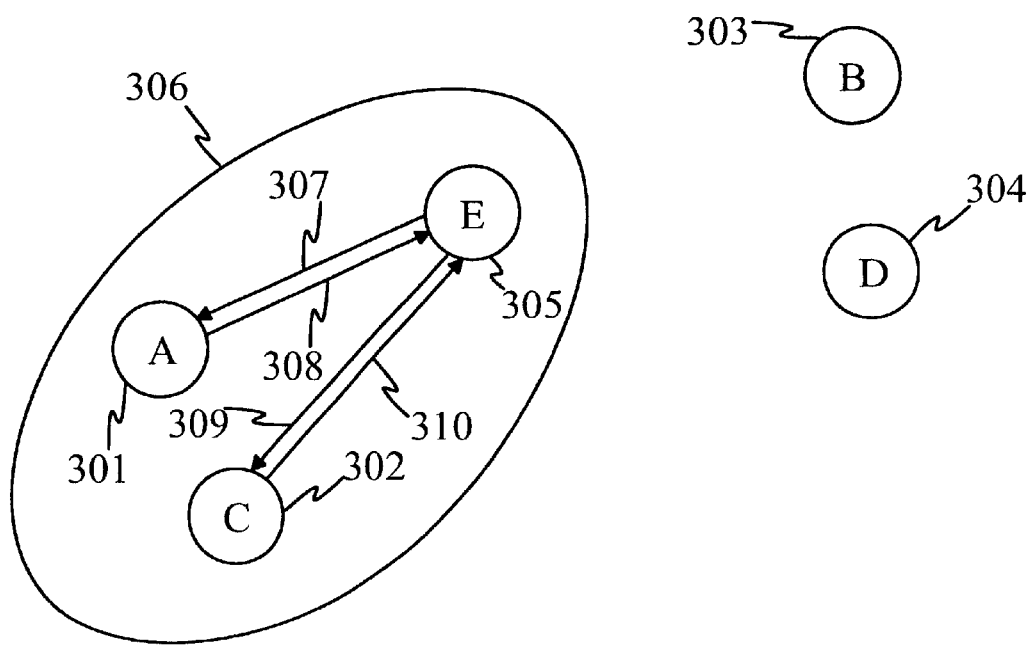

Persons A, B, C and D (references 301, 302, 303 and 304) are members in a group in which applicant E (reference 305) applies for membership. The group has decided that, to become a member, it is enough that at least 75% of the members vote for the membership. In FIG. 3a, applicant E and group members A and C are within the range (reference 306) of the communication device of E, and members B and D are outside said range. E communicates through his communication device with member A, wanting to join the group to which A belongs. E sends an apply message to A (reference 307), after which A votes that he either accepts or does not accept applicant E as a member of the group. In this case, A does not accept applicant E as a member and sends as feedback information his decision to E (reference 308).

Applicant E preferably sends the apply message with a communication application that is used in both the communication device of applicant E and the communication devices of the group members.

When receiving the decision of member A, the communication device of E preferably also receives information on the other members of the group, but this information is not necessarily transmitted to the user E of the communication device. Instead, E may receive for instance the number of members in the group, whereby the applicant will know how many group members have voted or are yet to vote. On the basis of the received information, the communication device of applicant E notices that member C is also within range and sends the apply message to member C (reference 309). Correspondingly, C votes and, in this case, decides to accept applicant E as a member of the group and sends his decision to E (reference 310). Applicant E now knows the answers of members A and C and the number of members in the group. E then knows that he must yet receive a reply from two other group members. Depending on what the group has agreed, E can also, but not necessarily, receive the names of all members in the group, in which case E can re-locate to an area where he assumes the group members are.

Figure 3B:
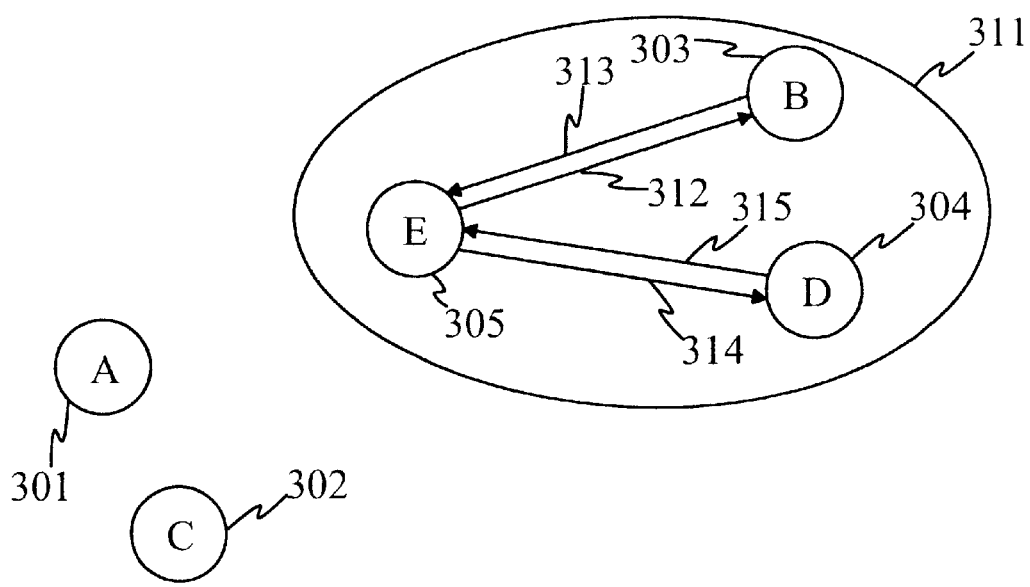

In FIG. 3b, applicant E and group members B and D are within the range (reference 311) of the communication device of E, and members A and C are outside said range. The communication device of applicant E detects the communication devices of members B and D and sends an apply message to B (reference 312) and D (reference 314). Member B receives E's apply message and votes accepting E as a member of the group by sending his reply (reference 313) to E. Correspondingly D receives E's apply message and votes for accepting E's membership by sending his reply to E (reference 315). Applicant E has now received a reply from all group members and E's communication device knows that the limit of 75% set as the criterion for becoming a member has been reached. E's communication device then informs E of the membership.

Figure 3C:
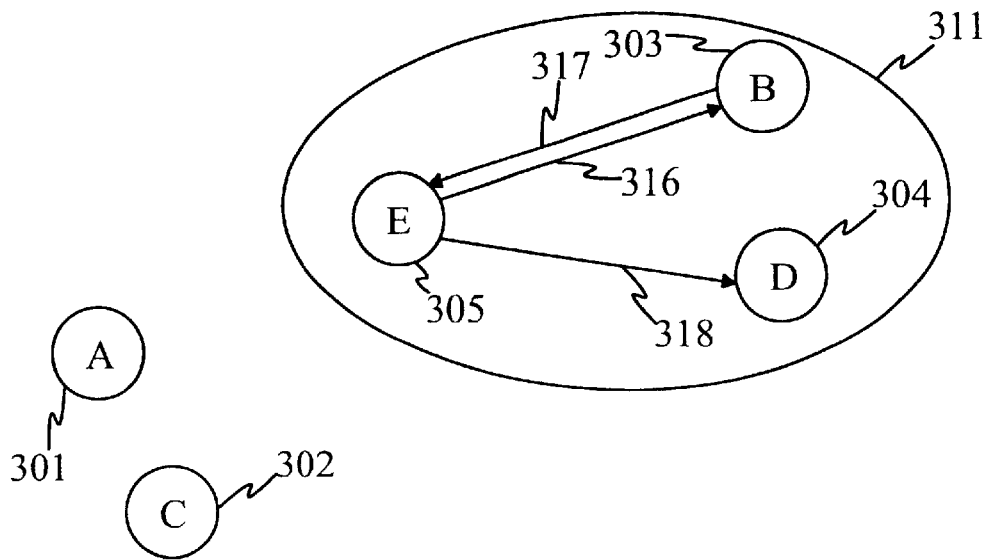

In FIG. 3c, applicant E and group members B and D are still within the range (reference 311) of E's communication device. Since E now knows that he is a member of the group, he can inform the group members of his new membership and ask a member within the range of his communication device, in this case B, information on the group and the other members of the group (reference 316). Member B receives information that E has become a member and the request for information related to the group. At the same time, information on E's membership is updated in B's communication device. B sends the information to E (reference 317), which information can comprise for instance a welcome note to the new member, information on internal matters of the group, members or how the group works. E's communication device also detects group member D within range, and E's communication device sends information on becoming a member to the communication device of member D (reference 318). Alternatively, member B can also send information to D on applicant E's membership immediately after B has received said information from applicant E.

Figure 3D:
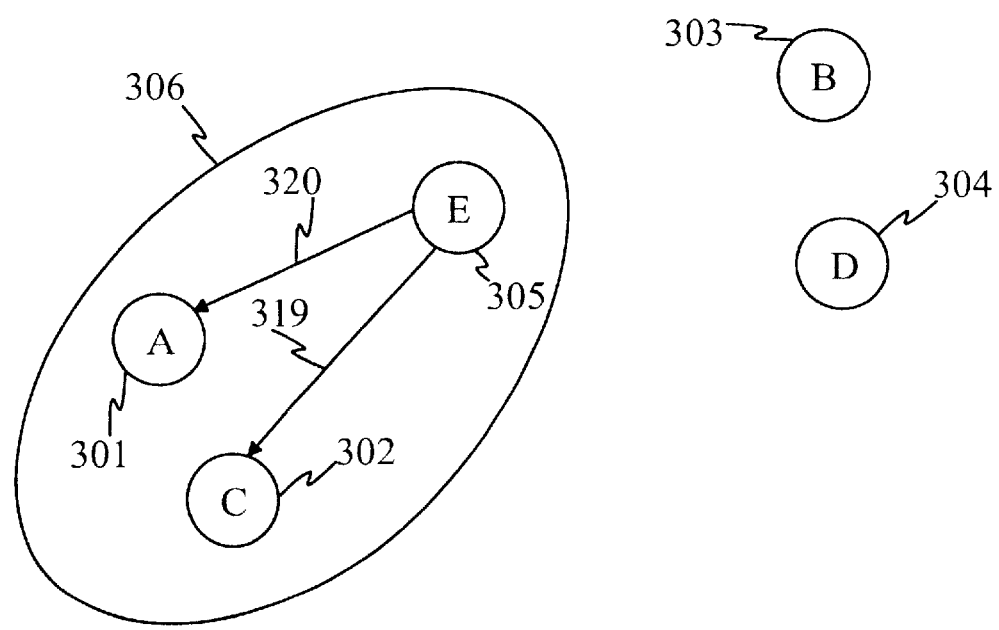

In FIG. 3d, group members A and C are within the range (reference 306) of E's communication device. E also informs members A and C of his membership by sending a message to A (reference 320) and C (reference 319). Alternatively, information on E's membership can also be transmitted between group members from the first member to the second, for instance from E to A and A to C.

Figure 4:
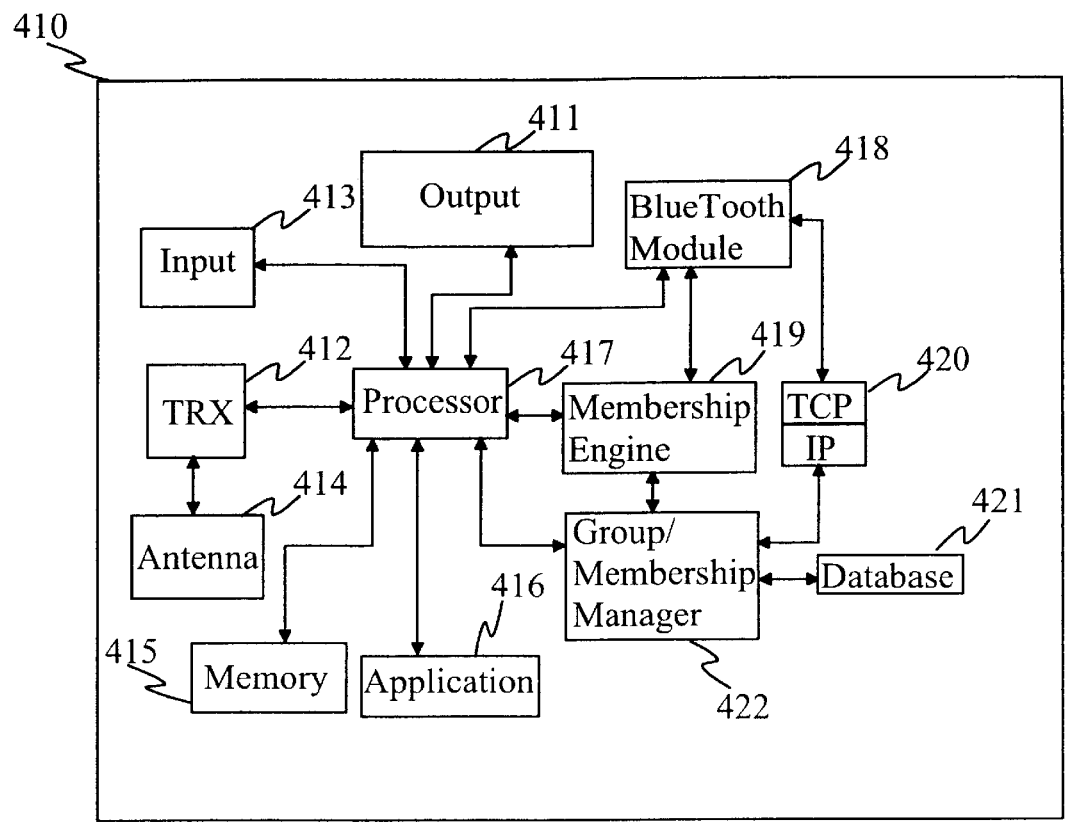
FIG. 4 shows a wireless communication device according to an embodiment of the invention, FIGS. 5a to 5e describe a system according to an alternative embodiment of the invention.

FIG. 4 shows a wireless communication device 410 according to an embodiment of the invention. The communication device 410 comprises an output 411, such as a loudspeaker or display, an input 413, such as a microphone, keyboard or touch screen, for creating and receiving information, a processor 412 and memory 416 for executing the functions of the communication device, and one or more transceivers 414 and one or more antennas 415 for establishing a radio-frequency connection for instance to a Bluetooth system, or for some other short-range radio communication, or to a mobile system, such as GSM. In addition, the communication device 410 comprises a communication application that can further comprise one or more applications 417, such as an application for creating an apply message and applying for membership, an application for creating feedback information, i.e. feedback, to said apply message, an application for forming a decision on becoming a group member in response to the received feedback, an application for voting or data exchange between members of a group and for enabling communication between a Bluetooth module 418 and other Bluetooth devices. The transmission and reception of an apply message and feedback are preferably implemented by the communication application 416, the antenna 414, transceiver 417 and Bluetooth module 418 and by the processor controlling the functions of the communication device 410.

The communication device 410 also comprises a group communication system (references 419 to 422), by means of which the structure of the group is maintained. In addition, the group communication system maintains information on the situation of an applicant applying for membership in the group and the voting situation of the group members at each time.

The tasks of a membership engine 419 are to detect automatically new devices within the range of the communication device 410 and to identify the identifier of said device and the services provided by the device. In addition, the membership engine 419 informs a group membership manager 422 of changes in the members of the group and their information or properties and sets the communication device 410 to different communication modes.

In a Bluetooth, i.e. BT, system, it is possible to detect all other BT devices using the protocols of said system. Information on detected devices is received in the membership engine 419, in which the information is processed and transmitted to other blocks needing the information, such as to the group membership manager 422 or a database 421. The membership engine 419 can filter to a user for instance information on devices belonging to the same group and within radio range.

Activate, park, hold and sniff modes are properties of all BT devices, in which the device is either in a network, such as pico network, active or passive. A master device of the network largely controls these modes. Each BT device has its own, unique ID that the membership engine recognizes and processes on the basis of the information it has received on the BT module 418. All information coming from the BT module 418 passes through the membership engine, which means that any structural changes in the group also pass through it.

The group membership manager (GMM) 422 manages the group structure by creating and defining the properties of the group and its members. In addition, its task is to control the communication traffic between user interface applications and data transfer protocols 420 (TCP/IP).

The group membership manager 422 processes the information in the group information matrix, such as the status, device ID, name, and other information of the members stored in the database. The group properties can comprise a certain part of the group information. The voting percentage of the group can for instance be stored for a majority decision related to the acceptance of a new member. Other information, too, can be stored depending on the activities, needs or available applications of the group. The user can modify said information using the user interface applications of the device. The device can also modify said information depending on the information he has received from the network. The related default values are formed, entered and stored in the database 421 when the group is created.

The properties of the members comprise all information that it is necessary to store of the members. There is a link from the group information matrix to this member information. Group properties can be for instance information that is not needed for communicating.

The database 421 comprises information, such as the group information matrix that comprises information like name, address and the like on the group members. In addition, the database comprises information on the member's properties, the member's device ID, the applicant's profile and properties, and information on transmitted and received messages. The database 421, which comprises a structural database and a message database, has a storage space for all structural information related to the group and for messages and user information, for instance.

All information related to a group or its members, i.e. in practice information related to the structure of the group, are stored in the structural database. Information on the traffic amounts of different users can also be stored in the structural database for use for instance when defining an optimal master device for the network. The device transmitting and/or receiving the highest amount of data could be defined as the master device and the others as slave devices.

Messages and other user information are stored in the message database, as is traffic information maintaining the most recent list of the ID numbers of different messages that are linked to the actual messages. This makes it possible to have messages that have not yet been sent to all recipients (who are not with range, for instance) wait in queue until they can be sent.

The communication device 410 is preferably a Bluetooth communication device or some other communication device operating in a short-range ad hoc network. The communication device can also contain other communication systems, such as a GSM or GPRS system that can be used to assist in transmitting and receiving messages of the group for instance when the group members are at a distance from each other that makes it difficult to implement a short-range network between the group members.

The functional blocks of the implementation according to the invention, such as the membership engine 419, the group membership manager 422 and the database 421, can be implemented as a program code in the C or Java programming languages, for instance, but other programming languages can also be used. The group membership manager, which maintains the group structure in each device belonging to the group, can be implemented in a manner that enables Java applications, such as the membership application, voting application or other applications, to communicate with said group membership manager. Messages transmitted between the devices belonging to the group, such as a membership request message from an applicant to a group member and a feedback message from the member to the applicant, are delivered using a special protocol related to the application and above the IP protocol.

FIGS. 5a to 5e describe a system according to an alternative embodiment of the invention, in which system decision-making, i.e. vote on the membership of an applicant, takes place inside the group. The applicant can send to a group member a message in which he indicates that he wants to join said group as a member. The message can be a voice message, a short message or a message created with a group communication application. The communication device of the applicant thus need not necessarily have the same group communication application as the communication devices of the group members, but it can be installed in the applicant's device for instance after the applicant's membership has been accepted. After the applicant has sent his request to the group member, the applicant can also send at least one of the following identifiers to the group member: the identifier associated with the applicant, the identifier associated with the communication device of the applicant, or both above-mentioned identifiers. The identifier associated with the applicant can comprise for instance name, address or other corresponding identification or contact information. The identifier associated with the communication device of the applicant can comprise for instance the identifier or identity number of the applicant's communication device. The identifier can also comprise a combination of both above-mentioned identifiers. The task of said member is to begin a vote by generating a voting event by means of the group communication application of his communication device. The voting event can be an application, for instance, operating under said group communication application. A voting event will be described in the following with reference to FIGS. 5a to 5e.

The figures show applicant E (reference 501) and group member A (reference 502), record 508 of A's communication device, B (reference 503), record 528 of B's communication device, C (reference 504), record 518 of C's communication device, D (reference 505), and record 538 of D's communication device. In addition, FIG. 5e shows record 548 of applicant E after E has been accepted as a member of the group.

Figure 5A:
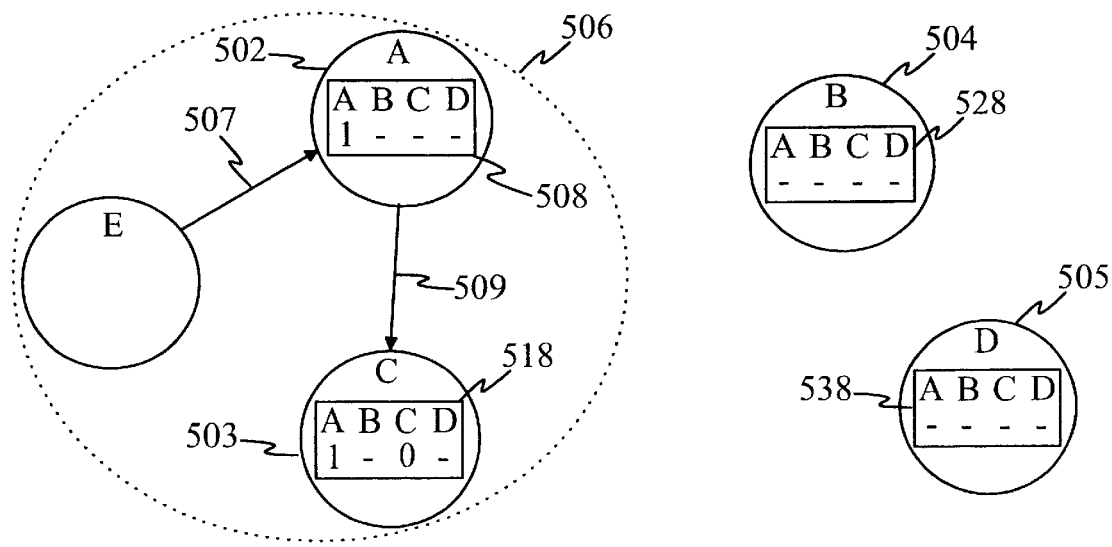

FIG. 5a shows a situation where applicant E and group members A and C are within range 506, and members B and D out of range. E wants to join the same group as A and transmits to A an apply message 507 preferably through a communication application in E's communication device. Said message can also be sent from E to A for instance as a voice message, short message or in a manner made possible by some other communication method or application. When receiving the apply message, member A also preferably receives an identifier associated with applicant E, the communication device of applicant E or both the above.

After A has received the apply message from E, A can launch a group communication application to form his decision on E's membership. All communication described in the following between the group members and between the members of said group and the applicant is performed through a communication application. Said application is in the communication device of each group member and comprises in A's communication device the record 508 that comprises information on each group member, such as the identifier, for instance name, associated with the member, or the identifier associated with the communication device of each member. Said record can also comprise information of the voting situation of each member and information on applicant E applying for membership in the group, such as the apply message, the identifier associated with the applicant or the identifier associated with the communication device of the applicant or both above-mentioned identifiers. In this example, '1' in the record means that the member has voted for the membership of the applicant, '0' means that the member has voted against the membership of the applicant, and '-' means that the member has not yet voted.

Record 508 now has the voting result '1' of member A stored in it. Member A then sends (reference 509) the information of said record 508 to all group members within the range of the communication device of A. In this example, the information of record 508 is sent to group member C who receives the information of said record 508, whereby the information that member A changed is updated in C's record 518. Using the application of his communication device, C forms a decision concerning applicant E and stores the voting result '0' in record 518 of his communication device. If after C's vote, A's communication device is still within the range of C's communication device, C can send his own voting result to A. In the example case, A is out of C's range and does not yet receive C's voting result.

Figure 5B:
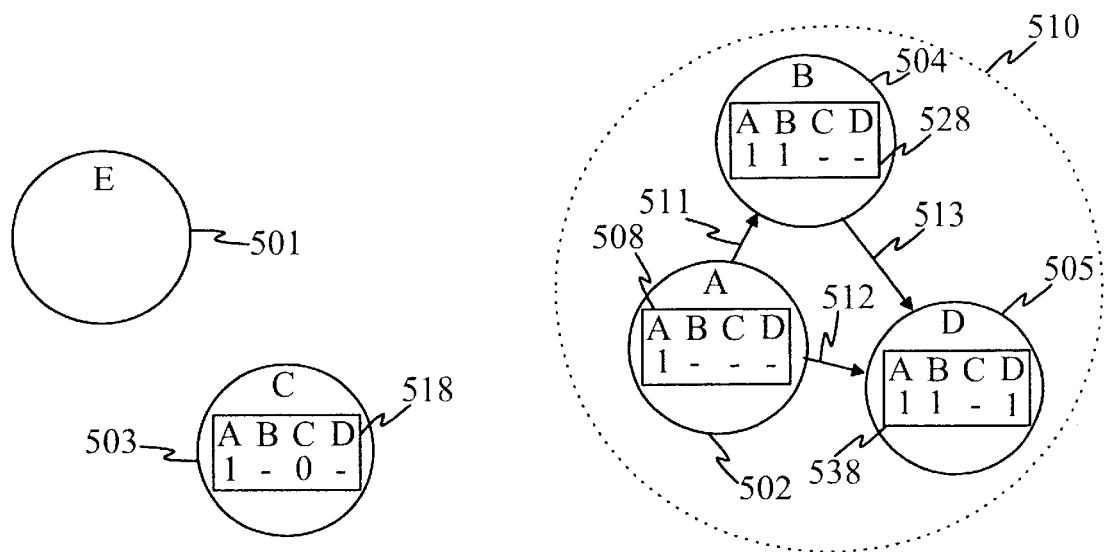

FIG. 5b shows a situation in which members B and D are within the range 510 of A's communication device. A sends to B (reference 511) and D (reference 512) the information of record 508 containing A's voting result. B receives the information sent by A and the information is stored in B's record 528. B adds his own voting result '1' to said record 528 and transmits (reference 513) the information of said record on to D. D receives the information from both A and B and adds his own voting result '1' to record 538.

Figure 5C:
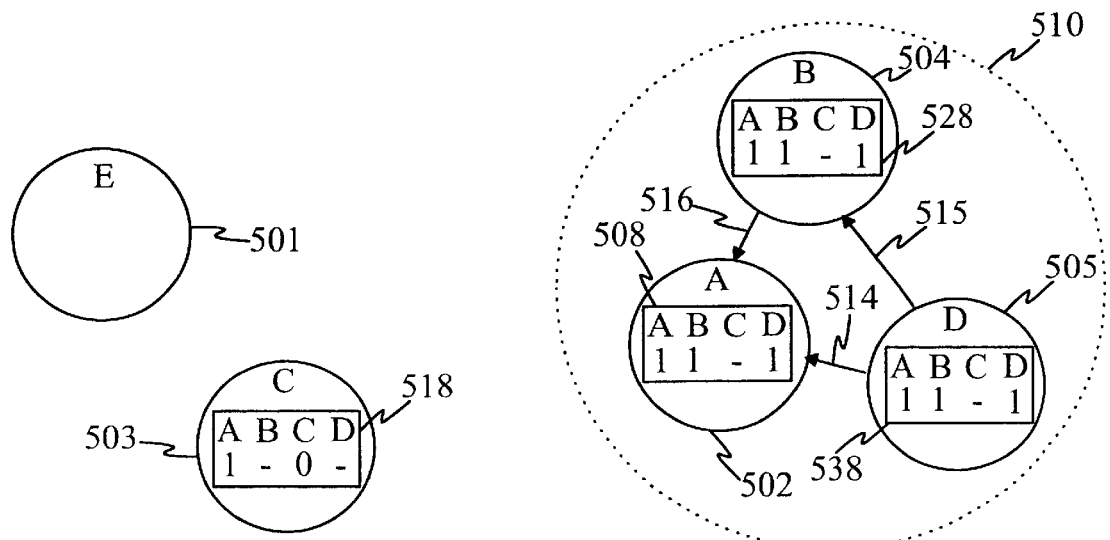

FIG. 5c shows a situation in which D sends the information of record 538 updated by his own voting result back to A to his record 508 (reference 514) and to B to his record 528 (reference 515). Alternatively, A can also receive the information D updated in record 538 from B (references 515 and 516).

Figure 5D:
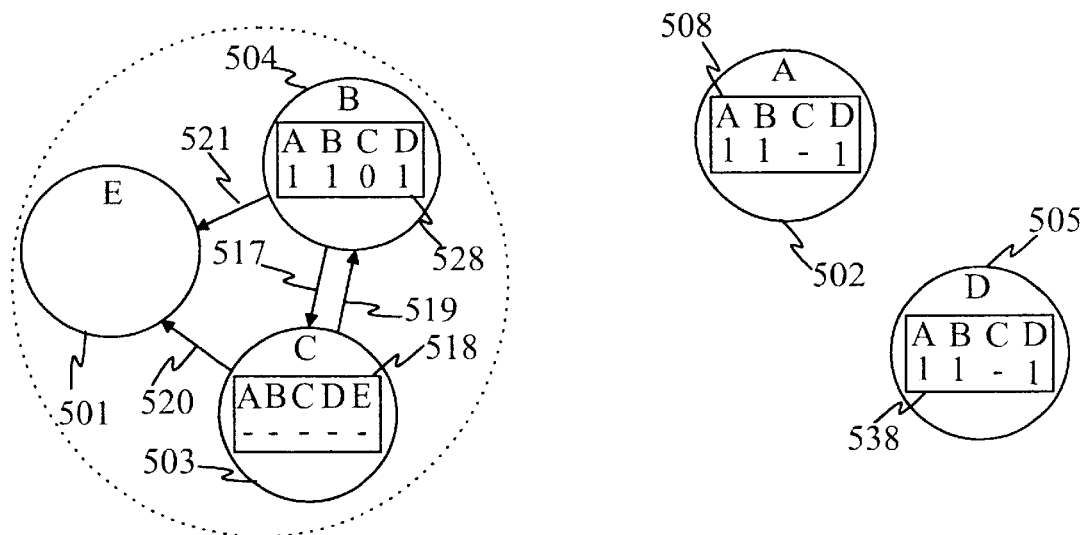
Figure 5E:
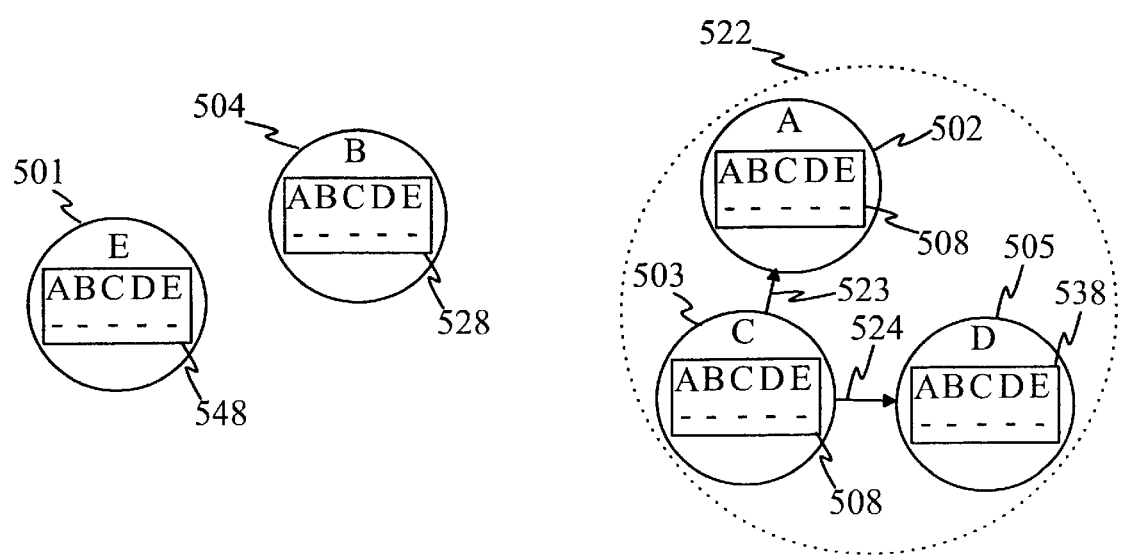

FIG. 5d shows a situation in which member B has come within the range of the communication devices of applicant E and member C. B sends the information of his record 528 (reference 517) to C and receives from C the information of record 518. Now both B's and C's records contain information on the voting results of all members, which is shown in B's record 528 in FIG. 5d. Correspondingly, C's record 518 has information on the final voting result, and record 518 of member C is updated so as to also comprise the information of applicant E. This has been shown in C's record 518 in FIG. 5d. The communication devices of members B and C are able to form the final voting result on the membership of applicant E. In the example case, member C informs applicant E of the voting result of the group (reference 520). B, too, could inform E of the voting result of the group (reference 521). After receiving information on becoming a member, E can also receive information on the group, such as record 518 updated by C and name and other information on the group members or information on internal matters of the group.

FIG. 5e shows a situation in which the records of members E and B have been updated to also comprise member E. Members A and D are within the range of the communication device of member C and receive information on the final voting result from member C (references 523 and 524).

The method of the invention is not limited for use only in temporary short-range networks like the Bluetooth systems, but other systems, such as the GSM and GPRS systems, can also be used in the implementation of the method of the invention. Also, the size of the group in the Bluetooth system is not limited to the maximum number of simultaneously active devices, which is 8 (1 master device and 7 slave devices). Because the master device is able to change each slave device to passive or active on request by the slave devices or by its own decision, voting feedback can also be received from outside the group of active devices, if there are more than 8 members in the group and all members are within range at the same time.

The implementation and embodiments of the invention are described herein by means of examples. It is apparent to a person skilled in the art that the invention is not restricted to the details of the embodiments described above and that the invention can be implemented in other forms without departing from the characteristics of the invention. The described embodiments should be considered illustrative and not restrictive. Therefore, the implementation and use of the invention are only restricted by the attached claims. Thus, the different implementation alternatives of the invention, including equivalent implementations, defined in the claims are also within the scope of the invention.

What is claim is:

1. A method for selecting a new member to a communication group of users of wireless communication devices, the communication group comprising
    at least two communication device users who are members of said group, and
    at least one communication device user who does not belong to said group, applies for membership in said communication group and is capable of communicating with at least one member of the communication group through his communication device, wherein the method comprises the following steps:
    creating an apply message in said communication device not belonging to the group, said apply message comprising a request for membership in said communication group;
    transmitting the apply message wirelessly from said communication device not belonging to the group to the communication device of at least one member of said communication group for the purpose of becoming a member of said group;
    creating, ordered by at least one group member, a feedback concerning joining said group in response to the received apply message; and
    forming a decision on joining said group in response to said at least one feedback.

2. A method as claimed in claim 1, wherein said apply message is created in the communication device of the user of said communication device in response to the input of the user of said communication device.

3. A method as claimed in claim 2, wherein said apply message also comprises at least one of the following identifiers: an identifier associated with said communication device, an identifier associated with the user of said communication device.

4. A method as claimed in claim 3, wherein said apply message is created as one of the following: a voice message, a short message or a message created by a communication application.

5. A method as claimed in claim 1, wherein said apply message is sent from said communication device not belonging to the communication group to at least one communication device belonging to said communication group.

6. A method as claimed in claim 1, wherein said feedback is created in the communication device of at least one group member in response to the input of said group member.

7. A method as claimed in claim 6, wherein said feedback is the voting result of said group member and comprises a decision to accept or not to accept the communication device user not belonging to said group as a member of said group.

8. A method as claimed in claim 7, wherein said feedback further comprises at least one of the following identifiers: an identifier associated with the member of said group, an identifier associated with the communication device of said group member.

9. A method as claimed in claim 8, wherein said feedback is sent to said user of the communication device not belonging to the group.

10. A method as claimed in claim 9, wherein said decision on joining said group is formed in the communication device of the user of said communication device not belonging to the group on the basis of said feedback.

11. A method as claimed in claim 8, wherein said feedback and the received apply message is sent by at least one member of said group on to at least one other member of said group.

12. A method as claimed in claim 11, wherein said decision is formed in the communication device of the member of said group on the basis of said feedback and the feedback created by at least one other member of said group.

13. A wireless communication device for said communication device user joining a communication group of wireless communication devices, said communication group comprising at least two users of communication devices who are members of said group, and said communication device being capable of communicating with the communication device of at least one member of said communication group, wherein said wireless communication device comprising:
    means for creating an apply message in said communication device, said apply message comprising a request for membership in said communication group;
    means for transmitting the apply message wirelessly from said communication device to the communication device of at least one member of said communication group;
    means for receiving a feedback wirelessly from the communication device of at least one member of said group in response to the transmitted apply message; and
    means for forming a decision on joining said group in response to said feedback.

14. A wireless communication device as claimed in claim 13 wherein said wireless communication device is a Bluetooth device.

15. A wireless communication device as claimed in claim 13, wherein said wireless communication device also comprises means for receiving a decision wirelessly from at least one communication device in said communication group in response to the sent apply message.

16. A wireless communication device as claimed in claim 13, wherein said means for creating an apply message are also arranged to generate into said apply message at least one of the following identifiers: an identifier associated with said communication device, an identifier associated with the user of said communication device.

17. A wireless communication device as claimed in claim 15, wherein said means for creating an apply message are arranged to create said apply message as one of the following: a voice message, a short message or a message created by a communication application.

18. A communication device for selecting a user of a second communication device not belonging to a communication group of wireless communication devices, said communication group comprising at least two users of communication devices who are members of said group, and said wireless communication device is used by at least one of the group members and said wireless communication device is capable of communicating with at least a second communication device not belonging to said communication group, wherein said wireless communication device comprising:
    means for receiving an apply message wirelessly, said apply message comprising a request for membership in said communication group;
    means for creating a feedback on accepting the communication device applying for membership in the group in response to the received apply message;

means for transmitting the feedback wirelessly to at least one of the following:
the communication device of the user of said communication device not belonging to the communication group,
the communication device of at least one other member of said communication group.

19. A wireless communication device as claimed in claim 18, wherein said communication device also comprising means for transmitting said apply message to the communication device of at least one other member of said group.

20. A wireless communication device as claimed in claim 19, wherein said communication device also comprises means for receiving a feedback from at least one other member of said group.

21. A wireless communication device as claimed in claim 20, wherein said communication device also comprises means for forming a decision on the user of said communication device not belonging to the communication group joining said group in response to said feedback and said at least one other feedback of a member of said group.

22. A wireless communication device as claimed in claim 21, wherein said communication device also comprises means for transmitting the decision to said communication device user not belonging to the group on joining said group.

23. A wireless communication device as claimed in claim 15, wherein said means for creating a feedback are arranged to create the feedback on the basis of the voting result of at least one group member, the voting result comprising the decision of said member to accept or not accept said communication device user not belonging to the group to become a member of said group.

24. A wireless communication device as claimed in claim 23, wherein said means for creating a feedback are also arranged to generate into said feedback at least one of the following identifiers: an identifier associated with the member of said group, an identifier associated with the communication device of said group member.

25. A wireless communication device as claimed in claim 18, wherein said wireless communication device is a Bluetooth device.

26. A system for selecting a new member to a communication group of users of wireless communication devices, the communication group comprising
at least two users of communications devices who are members of said communication group, and
at least one user of a communication device not belonging to said group who applies for membership in said communication group and is capable of communicating with at least one member of the communication group through his communication device, wherein the system comprises:
means for creating an apply message in the communication device not belonging to said group;
means for transmitting the apply message wirelessly from the communication device not belonging to said group to at least one member of said communication group for the purpose of becoming a member in said group;
means for receiving the apply message wirelessly, said apply message comprising a request for membership in said communication group;
means for creating a feedback on accepting the communication device applying for membership in the group in response to the received apply message;

means for transmitting the feedback wirelessly to at least one of the following:
the communication device of the user of said communication device not belonging to the communication group,
the communication device of at least one other member of said communication group;
means for forming a decision on joining said group in response to said feedback.

27. A computer program product for a wireless communication device for the user of said communication device to join a communication group of wireless communication devices, the communication group comprising at least two users of wireless communication devices who are members of said group, and said wireless communication device being capable of communicating with the communication device of at least one member of said communication group, wherein the computer program product comprises:
computer program means for making said wireless communication device to create an apply message, said apply message comprising a request for membership in said communication group;
computer program means for making said wireless communication device to send the apply message wirelessly to at least one member of said communication group for the purpose of becoming a member of said group;
computer program means for making said wireless communication device to receive a feedback wirelessly from at least one member of the group in response to the transmitted apply message; and
computer program means for making said wireless communication device to form a decision on joining said group in response to said feedback.

28. A computer program means for a wireless communication device for selecting a user of a second communication device not belonging to a communication group of wireless communication devices to said communication group, said communication group comprising at least two users of wireless communication devices who are members of said communication group, and said wireless communication device being used by at least one of the group members and capable of communicating with at least one other communication device not belonging to said communication group, wherein the computer program product comprises:
computer program means for making said wireless communication device to receive an apply message wirelessly, said apply message comprising a request for membership in said communication group;
computer program means for making said wireless communication device to create a feedback on accepting the communication device applying for membership in the group in response to the received apply message;
computer program means for making said wireless communication device to transmit the feedback wirelessly to one of the following:
the communication device of the user of said communication device not belonging to the communication group,
the communication device of at least one other member of said communication group.

* * * * *